US005416820A

United States Patent [19]

Weil et al.

[11] Patent Number: 5,416,820

[45] Date of Patent: May 16, 1995

[54] ROTARY-ANODE X-RAY TUBE COMPRISING A COOLING DEVICE

[75] Inventors: Lothar Weil, Hamburg; Rolf Behling, Norderstedt; Michael Lübcke, Hamburg; Heinz-Jürgen Jacob, Norderstedt, all of Germany

[73] Assignee: U.S. Philips Corporation, New York, N.Y.

[21] Appl. No.: 110,037

[22] Filed: Aug. 20, 1993

[30] Foreign Application Priority Data

Aug. 20, 1992 [DE] Germany ........................ 42 27 495.8

[51] Int. Cl.[6] ............................................... H04J 35/10

[52] U.S. Cl. .................................... 378/130; 380/127; 380/141

[58] Field of Search ............... 378/125, 127, 130, 129, 378/132, 133, 141, 144

[56] References Cited

U.S. PATENT DOCUMENTS

| | | | |
|---|---|---|---|
| H312 | 7/1987 | Parker | 378/130 X |
| 4,674,109 | 6/1987 | Ono | 378/130 |
| 4,928,296 | 5/1990 | Kadambi | 378/130 X |
| 5,018,181 | 5/1991 | Iversen et al. | 378/130 X |
| 5,056,127 | 10/1991 | Iversen et al. | 378/130 |
| 5,077,775 | 12/1991 | Vetter | 378/132 |
| 5,091,927 | 2/1992 | Golitzer et al. | 378/130 |

FOREIGN PATENT DOCUMENTS

| | | |
|---|---|---|
| 0430367 | 6/1991 | European Pat. Off. . |
| 2813860 | 10/1979 | Germany . |

*Primary Examiner*—David P. Porta
*Attorney, Agent, or Firm*—Jack D. Slobod

[57] ABSTRACT

An anode of a rotary-anode X-ray tube is connected to a bearing portion which is rotatable about an axis of rotation and which cooperates with the stationary bearing portion in which there is provided a cavity which extends in the direction of the axis of rotation and whose side walls can be cooled by means of a cooling medium. Effective cooling, in combination with a small pressure drop of the cooling medium, is achieved in that there is provided a cooling member which serves to produce an essentially laminar cooling medium flow and which consists of a number of lamellae which extend essentially parallel to the axis and which are in thermal contact with the side walls of the cavity.

17 Claims, 2 Drawing Sheets

ROTARY-ANODE X-RAY TUBE COMPRISING A COOLING DEVICE

BACKGROUND OF THE INVENTION

1. Field of the Invention

The invention relates to a rotary-anode X-ray tube whose anode is connected to a bearing portion which is rotatable about an axis of rotation and which cooperates with a stationary bearing portion in which there is provided a cavity which extends in the direction of the axis of rotation and the side walls of which can be cooled by means of a cooling medium circuit.

2. Description of the Related Art

A rotary-anode X-ray tube of this kind is known from EP-OS 430 367which corresponds to U.S. Pat. No. 5,091,927. The known rotary-anode X-ray tube comprises a sleeve bearing in the form of a so-called helical groove bearing in which a liquid lubricant, for example a gallium alloy, is present between the rotatable bearing portion and the stationary bearing portion. Via this lubricant, a substantial flow of heat can be transferred from the rotatable bearing portion to the stationary bearing portion, notably to the side walls thereof. Therefore, effective cooling of the stationary bearing portion is required; to this end, it comprises a cylindrical cavity which has a circular cross-section and which extends in the direction of the axis of rotation. In the known rotary-anode X-ray tube, said cavity accommodates a cooling medium guide device which directs the cooling medium, arriving via a tube within the guide device, to the space between the tube and the side walls so that the cooling medium flows several times around the tube. This results in effective cooling, but the cooling medium guide device causes a substantial pressure drop so that the pump producing the circulation of the cooling medium in the cooling medium circuit must be designed for a high feed pressure.

SUMMARY OF THE INVENTION

It is an object of the present invention to construct a rotary-anode X-ray tube of the kind set forth so that effective cooling is achieved without giving rise to a substantial pressure drop in the cooling medium circuit. On the basis of a rotary-anode X-ray tube of the kind set forth, this object is achieved in that in order to produce an essentially laminar cooling medium flow there are provided a plurality of lamellae which extend essentially parallel to the axis of rotation and which are in thermal contact with the side walls of the cavity.

Contrary to the described rotary-anode X-ray tube, in which cooling is achieved in that turbulences are created in the cooling medium flow by the cooling medium guide device, in accordance with the invention the laminations produce a laminar cooling medium flow, i.e. an essentially turbulence-free cooling medium flow. As a result, the pressure losses remain small. The cooling with this laminar flow takes place in that the cooling medium cools not only the side walls but also the lamellae which are in suitable thermal contact with these side walls. The laminations thus have a dual function. They guide the cooling medium (in the spaces between neighbouring laminations) so that a laminar flow is obtained, and they also increase the surfaces areas in the cavity which transfer heat to the cooling medium.

Within the context of the invention, "lamellae" are to be understood to mean elements which are preferably made of metal and which have similar, preferably identical cross-sections in planes perpendicular to the axis of rotation, which cross-sections change slightly, however, in the direction parallel to the axis of rotation. In these cross-sectional planes the dimensions in the radial direction (where "radial" denotes the direction towards the axis of rotation) should be substantially larger than in the direction perpendicular thereto (tangential direction).

It is to be noted that from DE-OS 28 13 860 there is known an X-ray tube comprising a stationary anode whose anode body is provided with a cylindrical cavity extending in the longitudinal direction of the X-ray tube. A cooling member is in thermal contact with the end ,face of this cavity, said cooling member consisting of a solid central portion whose diameter increases towards the end face, as well as of star-shaped cooling ridges which are uniformly distributed over the circumference. A separating member enclosing this cooling member ensures that the cooling medium first flows past the cooling member, after which it flows back into the space between the separating member and the side walls of the cavity. Effective cooling of the side walls in a rotary-anode X-ray tube of the kind set forth could not be achieved by means of such a cooling device.

It would in principle be possible to form the lamellae in the stationary beating portion by means of a suitable process. Lamellae could also be individually mounted on the side walls of the, for example cylindrical cavity. Such manufacturing methods, however, would be extremely expensive. Substantially simpler manufacture is obtained when the lamellae form part of a sheet metal cooling member which adjoins the side walls and which has a star-shaped cross-section.

In a further embodiment of the invention, the cooling member is connected to the side walls by way of soldered joints which extend in the longitudinal direction of the lamellae. The soldered joints provide not only a reliable mechanical connection between the cooling member and the stationary bearing portion, but also a defined, suitable thermal contact.

It would in principle be possible to subdivide the cavity by means of a flat plate arranged at the axis of rotation, the cooling medium flow being applied to one side of the plate and be drained from the other side. A simpler supply of cooling medium which is turbulence-free at the area of the cooling member, however, is obtained when the cooling medium circuit comprises a tube which projects into the cooling member.

In a further embodiment of the invention, the cooling member consists of a plurality of sheet-metal lamellae which are bent about axes of curvature which constitute a respective plane in conjunction with the axis of rotation. For the manufacture of the cooling member so many identical, preferably rectangular sheets of sheet-metal must then be used as them are lamellae to be provided for the cooling member. These sheets should be bent so as to be U-shaped about a symmetry axis. Subsequently, the individual lamellae must be interconnected by welded joints on their free limbs, resulting in a lamellae assembly which can be adapted to the shape of the cavity by bending. When instead the lamellae assembly is formed from a single, rectangular sheet by suitable bending and folding operations, the welded joints can be dispensed with but it must be ensured that all lamellae have the same dimensions.

In a further embodiment of the invention, the cavity and the cooling member are shaped as a cylinder which is concentric with the axis of rotation and which has a circular cross-section, the inner diameter of the cooling member amounting to approximately half its outer diameter. The most effective cooling is obtained when these dimensions are chosen.

In a method for manufacturing a rotary-anode which includes a cooling device in its cavity, a soldering foil is wrapped around the cooling member, the soldering foil being slid into the cavity together with the cooling member, the cooling member being connected to the side walls of the cavity by heating the soldering foil.

BRIEF DESCRIPTION OF THE DRAWING

The invention will be described in detail hereinafter with reference to the drawings. Therein.

DETAILED DESCRIPTION OF THE PREFERRED EMBODIMENTS

Figure 1:
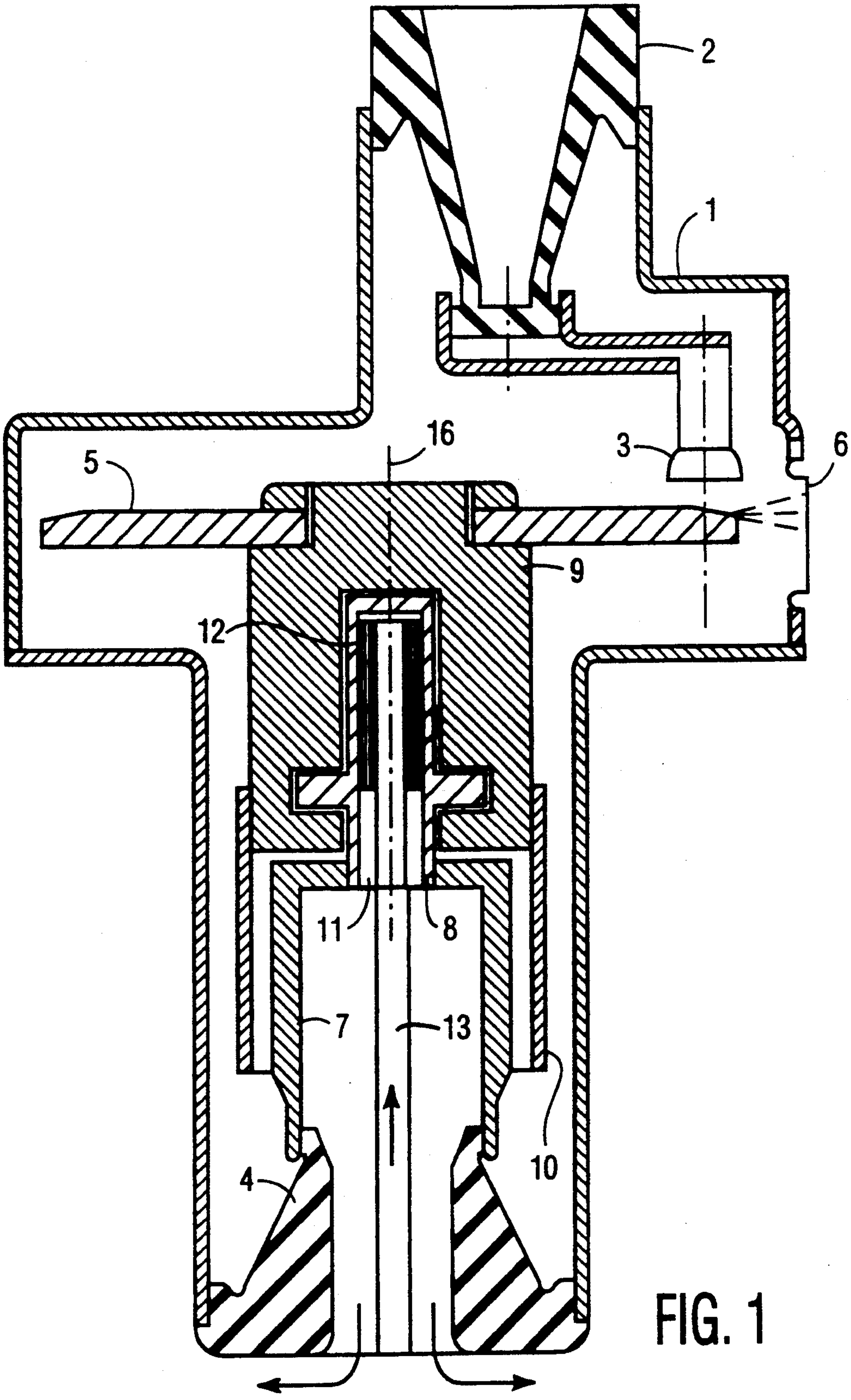
FIG. 1 shows a rotary-anode X-ray tube in accordance with the invention.

The rotary-anode X-ray tube shown in FIG. 1 comprises a metal envelope 1 whereto the cathode 3 is secured via a first insulator 2, the rotary anode being secured thereto via a second insulator 4. The rotary-anode comprises an anode disc 5 whose surface facing the cathode 3 emits X-rays when a high voltage is applied, said X-rays emerging from the envelope 1 via a radiation exit window 6 which is preferably made of beryllium. Via a sleeve bearing, the anode disc 5 is connected to a supporting member 7 which is connected to the second insulator 4. The sleeve bearing comprises a stationary bearing portion 8 which is connected to the supporting member 7 and aim comprises a cooperating bearing portion 9 which is rotatable about an axis of rotation 16 and whose lower end is provided with a rotor 10 for driving the anode disc 5 connected to its upper end. The stator cooperating with the rotor 10 is situated outside the metal envelope 1 and is not shown in FIG. 1.

The bearing portions 8 and 9 are constructed so as to be rotationally symmetrical relative to the axis of rotation 16, the rotating beating portion 9 enclosing the stationary bearing portion 8. On the outer faces of the stationary bearing portion 8 there are provided patterns of grooves which form, in conjunction with a film of a liquid lubricant present between the bearing portions, so-called helical groove beatings for taking up axial and radial bearing forces. For further details of such a helical groove bearing, reference is made to relevant publications, for example DE-OS 39 00 730 which corresponds to U.S. Pat. No. 5,077,775.

This construction provides a very good heat transfer between the anode disc 5 and the stationary bearing portion 8, enabling a heat flow of a few kW from the anode disc to the bearing portion 8 when the latter is effectively cooled. The cylindrical outer walls in the upper part of the bearing portion 8 are liable to heated to the highest temperature.

The stationary beating portion 8 is provided with a cylindrical cavity 11 which is concentric with the axis of rotation and has a length of, for example 100 mm and a diameter of 20 ram. In this cavity there is arranged a cooling member 12 which has a length of 57 mm and the upper end of which is situated at a distance of, for example 3 mm from the upper end face of the cavity, its outer diameter being adapted to the diameter of the cavity 11 and its inner diameter amounting to half its outer diameter, i.e. 10 mm.

A tube 13 which serves to supply cooling medium projects into the space within the cooling member, the upper end of said tube terminating at the same distance from the upper end face of the cavity 11 as the cooling member 12. In the operating condition, a cooling medium is supplied, as denoted by the arrow in the tube 13, which emerges between the end face of the cavity 11 and the end of the tube 13 and which subsequently flows through the cooling member 12. The cooling member 12, being only diagrammatically shown in FIG. 1, is constructed so that therein a laminar, essentially turbulence-free flow occurs which causes only a small pressure loss.

After flowing through the cooling member, the cooling medium emerges from the cavity 11 beyond the tube 13, flows through the lower part of the X-ray tube and subsequently flows around the X-ray tube in the space existing between the metal envelope 1 and a protective housing (not shown) enclosing the metal envelope. The cooling medium outlet is preferably provided in the part of the protective housing at the cathode side; from there the cooling medium is fed to a pump (not shown) which forces the cooling medium through the tube 13.

The details of the cooling member, its manufacture and its function will be described in detail hereinafter with reference to the FIGS. 2 and 3.

The cooling member is formed from a flat lamellae assembly whose length corresponds to the length of the member to be manufactured and which has a location-invariant cross-section in a plane perpendicular to its longitudinal direction. FIG. 2 shows this cross-section, the extreme lamellae at both sides being shown at an increased scale.

Figure 2:
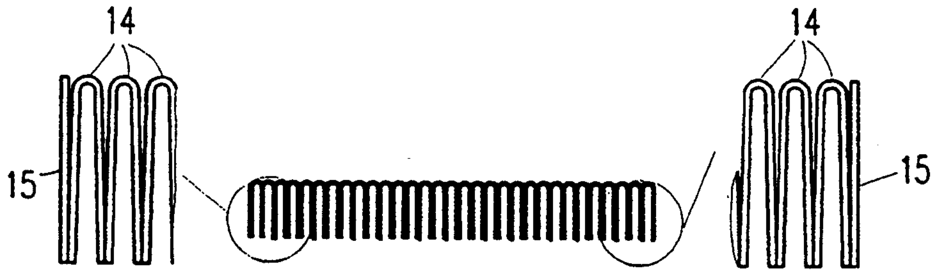
FIG. 2 shows a lamellae assembly for manufacturing a cooling member.
Figure 3A:
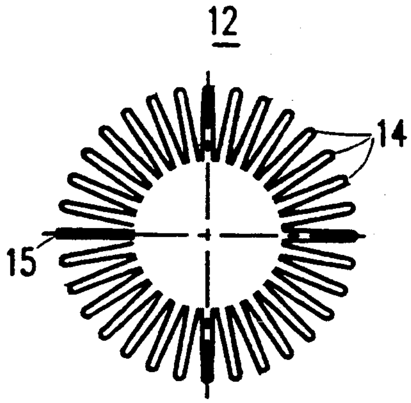
FIGS. 3*a* and *b* are a cross-sectional view and a side elevation, respectively, of the cooling member.

The lamellae assembly consists of 32 lamellae 14 which extend in the direction perpendicular to the plane of drawing of FIG. 2. All lamellae have the same dimensions and an approximately U-shaped cross-section, the radius of curvature in the lamellae arc amounting to approximately 0.3 ram, their limbs opening slightly towards their free end so that a space of between 0.7 and 0.8 mm remains therebetween.

Lamellae of this kind can be from sheet metal having a suitable thermal conductivity, preferably copper sheets. Each lamellae is then formed by bending from a flat copper sheet having a thickness of 0.2 mm, a width of 10 mm, and a length equal to the length of the cooling member to be formed. The lamellae assembly is formed from the individual lamellae by arranging the lamellae so as to be adjacent and by interconnecting the lamellae by spot welding, preferably by means of a laser, at several points which are offset relative to one another in the longitudinal direction. To both lateral sides of the lamellae assembly thus formed there is also welded a flat outer sheet 15. This sheet is also made of copper, has the same thickness and the same length as the sheets used to form the lamellae, but a height which is slightly smaller than that of the lamellae (for example, 4.7 ram).

It is alternatively possible to form the lamellae assembly from a single sheet whose surface area corresponds to the total surface area of all lamellae. In this sheet as many lamellae having an identical, U-shaped cross-section must be formed as there are lamellae to be included in the cooling member; this is realised by means of bending or folding operations. Spot welding can then be dispensed with, but a high manufacturing precision is required so as to ensure that all lamellae have the same cross-section. It is also possible to form a lamellae assembly from a plurality of sheets, several lamellae being present in each sheet. The sheets thus formed must then be combined so as to form a lamellae assembly.

The cooling member is formed from the flat lamellae assembly by bending about an axis which extends perpendicularly to the plane of drawing of FIG. 2 and which is situated underneath the lamellae assembly shown in FIG. 2. Bending is continued until the end sheets overlap one another, the end sheets being connected to one another at their outer edge (being the upper edge in FIG. 2) by spot welds spaced approximately 5 mm apart.

Figure 3B:
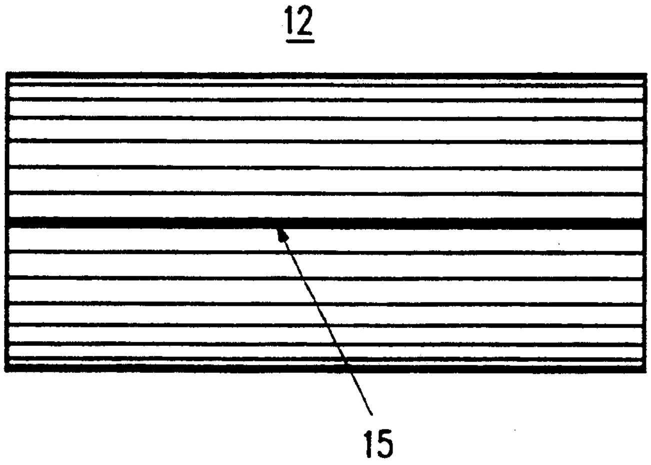

After bending of the lamellae assembly so as to be ring-shaped and after fixing of this shape by way of the spot welds, there is obtained a cooling member 12 having an approximately star-shaped cross-section (FIG. 3*a*) with a free circular area within said body. FIG. 3*b* shows this cooling member in a side elevation. This cooling member is elastic, i.e. it can be readily compressed by radial forces. Its outer diameter is slightly greater than the inner diameter of the cavity 11 in the stationary bearing portion.

Therefore, it would in principle be possible to introduce the cooling member into the cavity 11 by radial compression, the U-shaped arcs of the individual lamellae then engaging the inner walls of the cavity because of the resilience. However, in that case a non-defined heat transfer would occur which would depend on the surface condition of the cooling member and the side walls, on the temperature and on other factors. There would also be a risk that in given circumstances the cooling member could change its position inside the cavity in the course of time.

A defined heat transfer and a defined location of the cooling member can be achieved by soldering the cooling member to the side walls of the cavity 11 prior to the assembly of the bearing and prior to its introduction into the X-ray tube. The soldered joints should then extend along the entire length of each lamellae in order to obtain an as good as possible heat transfer between the side walls of the cavity and the lamellae.

To this end, the cooling member is wrapped in a soldering foil whose length and width correspond to the length and the circumference of the cooling member. The cooling member is introduced, together with the soldering foil, into the cavity 11 of the stationary portion before assembly of the X-ray tube or the bearing 8, 9.

Subsequently, the stationary bearing portion 8 and the cooling member 9 are heated, thus producing a soldered joint offering a very good and defined thermal connection between the stationary bearing portion 8 and the cooling member 9.

The stationary bearing portion 8 is generally made of a metal or a metal alloy. For example, when a TZM alloy is used, i.e. an alloy of titanium, zirconium and molybdenum, it is not simply possible to solder on a copper sheet. Therefore, prior to the introduction of the cooling member into the cavity 11, the latter must be prepared by providing its walls with a nickel layer.

A soldered joint can also be obtained by solder plating instead of by means of a soldering foil. The lamellae assembly is then provided with a solder layer on its outer side, which layer is rolled into the sheet or the sheets before they are used to form the lamellae assembly by bending or folding.

After connection of the cooling member to the stationary portion in this manner and after assembly of the stationary portion 8 and the rotatable portion 9 so as to form a bearing which itself is connected to the tube, the tube for feeding the cooling medium is introduced into the circular space within the cooling member. When the cooling medium, generally insulating oil, emerges from the end of the tube, it flows through the spaces between the tube 13 and the lamellae 14 of the cooling member on the one side and between the lamellae and the inner wall of the cavity 11 on the other side, lamellae heated due to their thermal contact with the stationary portion thus being cooled. The shape of the lamellae ensures that in said spaces a flow occurs which contains only few turbulences and which causes only a small pressure drop.

The high cooling efficiency which can thus be achieved could be further increased by using thicker lamellae or lamellae having a smaller radius of curvature. However, in that case the pressure drop would be greater and it would be difficult to bend the lamellae from such a thick sheet or with such a small radius of curvature.

The foregoing description is based on a sleeve beating in which the rotating bearing portion encloses the stationary bearing portion. The invention, however, can also be used for sleeve bearings in which the stationary bearing portion encloses the rotating beating portion. In that case an annular cavity should be provided in the stationary bearing portion and the lamellae should be in contact with the inner walls of this cavity.

The invention has been described on the basis of an embodiment in which the cavity has a cylindrical shape. However, the invention can also be used for a bearing with a cavity in the form of a surface of cone. Such a cavity would make sense when the sleeve bearing surface is also shaped as an envelope of cone, so that it can take up radial as well as tangential forces.

We claim:

1. A rotary-anode X-ray tube whose anode (5) is connected to a bearing portion (9) which is rotatable about an axis of rotation (16) and which cooperates with a stationary bearing portion 98) in which there is provided a cavity (11) which extends in the direction of the axis of rotation and the side walls of which can be cooled by means of flow of a cooling medium in a cooling medium circuit, characterized in that in order to produce an essentially laminar cooling medium flow directed essentially parallel to the axis of rotation there are provided a plurality of lamellae (14) within the cavity (11) which extend essentially parallel to the axis of rotation and which are in thermal contact with the side walls of the cavity (11).

2. A rotary-anode X-ray tube as claimed in claim 1, characterized in that the lamellae (14) form part of a sheet-metal cooling member (12) which adjoins the side wails and which has a star-shaped cross-section.

3. A rotary-anode X-ray tube as claimed in claim 2, characterized in that the cooling member (12) is connected to the side wails by way of soldered joints which extend in the longitudinal direction of the lamellae (14).

4. A rotary-anode X-ray tube as claimed in claim 2, characterized in that the cooling medium circuit comprises a tube (13) which projects into the cooling member (12).

5. A rotary-anode X-ray tube as claimed in claim 2, characterized in that the cooling member (12) consists of a plurality of sheet-metal lamellae (14) which are bent about axes of curvature which constitute a respective plane in conjunction with the axis of rotation (16).

6. A rotary-anode X-ray tube as claimed in claim 2, characterized in that the cavity (11) and the cooling member (12) are shaped as a cylinder which is concentric with the axis of rotation and which has a circular cross-section, the inner diameter of the cooling member amounting to approximately half its outer diameter.

7. A rotary-anode X-ray tube as claimed in claim 3, characterized in that the cooling medium circuit comprises a tube which projects into the cooling member.

8. A rotary-anode X-ray tube as claimed in claim 3, characterized in that the cooling member consists of a plurality of sheet-metal lamellae which are bent about axes of curvature which constitute a respective plane in conjunction with the axis of rotation.

9. A rotary-anode X-ray tube as claimed in claim 4, characterized in that the cooling member consists of a plurality of sheet-metal lamellae which are bent about axes of curvature which constitute a respective plane in conjunction with the axis of rotation.

10. A rotary-anode X-ray tube as claimed in claim 7, characterized in that the cooling member consists of a plurality of sheet-metal lamellae which are bent about axes of curvature which constitute a respective plane in conjunction with the axis of rotation.

11. A rotary-anode X-ray tube as claimed in claim 3, characterized in that the cavity and the cooling member are shaped as a cylinder which is concentric with the axis of rotation and which has a circular cross-section, the inner diameter of the cooling member amounting to approximately half its outer diameter.

12. A rotary-anode X-ray tube as claimed in claim 4, characterized in that the cavity and the cooling member are shaped as a cylinder which is concentric with the axis of rotation and which has a circular cross-section, the inner diameter of the cooling member amounting to approximately half its outer diameter.

13. A rotary-anode X-ray tube as claimed in claim 10, characterized in that the cavity and the cooling member are shaped as a cylinder which is concentric with the axis of rotation and which has a circular cross-section, the inner diameter of the cooling member amounting to approximately half its outer diameter.

14. A method of manufacturing a rotary-anode X-ray tube whose anode is connected to a bearing portion which is rotatable about an axis of rotation and which cooperates with a stationary bearing portion in which there is provided a cavity (11) which extends in the direction of the axis of rotation and the side walls of which are adjoined by a cooling member (12) within cavity (11), characterized in that a soldering foil is wrapped around the cooling member (12), the soldering foil being slid into the cavity (11) together with the cooling member, the cooling member being connected to the side walls of the cavity by heating the soldering foil.

15. A method as claimed in claim 14, characterized in that the cooling member is formed from a flat lamellae assembly by bending so as to obtain a ring shape.

16. A method as claimed in claim 15, characterized in that the flat lamellae assembly consists of a plurality of individual lamellae bent approximately through 180°, free limbs of said lamellae being connected to one another by welding.

17. A method as claimed in claim 15, characterized in that the flat lamellae assembly is formed from a single, rectangular sheet of metal, a plurality of lamellae being formed therefrom by folding or bending about axes extending parallel to one of the edges of the sheet.

* * * * *